UNITED STATES PATENT OFFICE.

HARRY McCORMACK, OF CHICAGO, ILLINOIS, ASSIGNOR TO RESEARCH LABORATORY OF CHICAGO, OF CHICAGO, ILLINOIS, A CORPORATION OF ILLINOIS.

PROCESS OF MAKING MANGANATES.

1,337,239.   Specification of Letters Patent.   Patented Apr. 20, 1920.

No Drawing.   Application filed January 6, 1919. Serial No. 269,740.

*To all whom it may concern:*

Be it known that I, HARRY McCORMACK, a citizen of the United States, residing at Chicago, in the county of Cook and State of Illinois, have invented certain new and useful Improvements in Processes of Making Manganates, of which the following is a specification.

This invention relates to improvements in processes of making manganates, and relates particularly to an improved process of making manganates of the alkali metals, *i. e.*, potassium and sodium.

The principal objects of the invention are to provide an improved process for the making of a manganate as an initial step in the preparation of the permanganate; to provide an improved process for separating said manganate from the other products resulting from the said initial step; to provide an improved process whereby a substantially pure permanganate is secured without recrystallization; to provide a process which shall be economical in the consumption of raw materials and shall incidentally be such that caustic remaining as a result of the process is recovered as a byproduct; to provide an improved process in which caustic alkali and manganese dioxid may be treated without the use of an oxidizing agent, such as a nitrate or a chlorate; and, in general, to provide an improved and economical process of the character referred to.

Describing the process in a general way, I first make a strong hydrous solution of caustic alkali and manganese dioxid, evaporate the solution to dryness, stirring meantime so that the resulting product is a dry pulverulent material, subsequently heating this material to a comparatively high temperature. The material so produced is redissolved in water, adding thereto a small quantity of caustic lime, the solution then being boiled vigorously several hours, after which the solids are filtered out. The solution is then concentrated to a specific gravity of about 1.4.

Upon cooling the above solution, the manganate crystallizes out, and these crystals are then separated from the mother liquor. The manganate crystals are next placed in cold water and the water is gradually heated to the boiling point. While the crystals are being dissolved, an oxidizing agent such as chlorin is gradually added to the solution in such regulated quantities that by the time the boiling point is reached, the chlorin will have oxidized the manganate to permanganate.

Instead of oxidizing by means of chlorin in the above described manner, the solution may be oxidized by the use of carbon dioxid or by electrolyzing the slightly alkaline solution, or by any other known equivalent oxidizing agent or process.

The resulting liquid, which contains the permanganate in solution, is subsequently concentrated to the desired specific gravity, in the case of permanganate of sodium, and the process is completed; or, if dealing with permanganate of potassium, the solution is concentrated to a specific gravity of about 1.2 hot, and subsequently cooled in order to crystallize out the permanganate of potassium.

Describing a specific application of my process in the production of permanganate of sodium, manganese dioxid is added to a concentrated solution of caustic soda in the proportion of 80 pounds of $MnO_2$ to each one hundred (100) pounds of caustic. The addition of $MnO_2$ is effected while the solution is in a fusion kettle which is heated, the heating being continued with repeated stirring until the mass has become pasty. The stirring is continued more and more vigorously as the moisture is driven off so as to break up all lumps of material, and the heating is continued until the moisture has entirely evaporated, leaving the material in the condition of a dry pulverulent mass. The temperature is then raised to approximately 450° C. and the heating is continued until the end of approximately eight hours from the time the heat was first applied. At this time the mass will be incipiently fused and in a somewhat pasty condition.

The fusion is now transferred to the solution tanks and dissolved in twice its weight of water, to which is added sufficient caustic lime to change any sodium carbonate present to sodium hydroxid. The solution is then boiled vigorously for several hours and is subsequently filtered so as to remove all solid material from the clear liquor which, after filtration, contains sodium hydroxid and sodium manganate. The solution is then concentrated, preferably in a direct heated open pan to a specific gravity of about 1.4. It is then cooled, whereupon the sodium manganate crystallizes in the strong caustic soda solution, the said crystals being separated from the liquor, either by a centrifugal apparatus or by filtering. The remaining solution, which contains caustic soda in solution, is saved for use in the initial step in the process, being combined with the necessary amount of strong caustic soda to bring it to the desired strength.

The sodium manganate crystals are then placed in about six times their weight of cold water, chlorin being passed into the solution while the crystals are dissolving. Heat is applied and the solution brought to boiling, the flow of chlorin being continued and so regulated that by the time the solution is brought to boiling, the contained sodium manganate will have been oxidized to sodium permanganate. The solution containing the sodium permanganate is then concentrated in the usual manner until it has the desired specific gravity.

It will be understood that the above described details of the process are merely illustrative of a specific application of my invention, the scope of which should be determined by reference to the appended claims.

I claim—

1. The improvement in the process of making an alkali-metal manganate, which consists in adding manganese dioxid to a hydrous solution of the alkali-metal hydroxid, evaporating said solution to dryness, further heating the material, dissolving the resultant material in water, separating the solids and so producing a clear liquor, cooling said liquor and separating therefrom the resulting crystals of manganate.

2. The improvement in the process of making an alkali-metal manganate, which consists in adding manganese dioxid to a hydrous solution of the alkali-metal hydroxid, evaporating said solution to dryness and heating to incipient fusion, dissolving the resultant material in water, separating the solids and so producing a clear liquid, cooling said liquor and separating therefrom the resulting crystals of manganate.

3. The improvement in the process of making an alkali-metal manganate, which consists in adding manganese dioxid to a hydrous solution of the alkali-metal hydroxid, evaporating said solution to dryness and heating to incipient fusion, dissolving the resultant material in water, converting any carbonate present into hydroxid, separating the solids and so producing a clear liquor, cooling said liquor and separating therefrom the resulting crystals of manganate.

HARRY McCORMACK.